US009894273B2

(12) United States Patent
Tilleman

(10) Patent No.: US 9,894,273 B2
(45) Date of Patent: Feb. 13, 2018

(54) MODULAR LENS FOR EXTREMELY WIDE FIELD OF VIEW

(71) Applicant: Rockwell Automation Technologies, Inc., Mayfield Heights, OH (US)

(72) Inventor: Michael M. Tilleman, Brookline, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 2 days.

(21) Appl. No.: 14/994,323

(22) Filed: Jan. 13, 2016

(65) Prior Publication Data

US 2017/0059858 A1   Mar. 2, 2017

Related U.S. Application Data

(60) Provisional application No. 62/209,716, filed on Aug. 25, 2015.

(51) Int. Cl.
| | | |
|---|---|---|
| *G02B 27/14* | (2006.01) | |
| *H04N 5/232* | (2006.01) | |
| *G02B 27/28* | (2006.01) | |
| *G02B 9/60* | (2006.01) | |
| *G01S 17/08* | (2006.01) | |
| *G01S 17/89* | (2006.01) | |
| *G01S 7/481* | (2006.01) | |
| *G01S 7/499* | (2006.01) | |
| *G02B 13/06* | (2006.01) | |
| *G02B 27/10* | (2006.01) | |
| *H04N 5/225* | (2006.01) | |

(52) U.S. Cl.
CPC ....... *H04N 5/23238* (2013.01); *G01S 7/4816* (2013.01); *G01S 7/499* (2013.01); *G01S 17/08* (2013.01); *G01S 17/89* (2013.01); *G02B 9/60* (2013.01); *G02B 13/06* (2013.01); *G02B 27/1066* (2013.01); *G02B 27/149* (2013.01); *G02B 27/283* (2013.01); *H04N 5/2254* (2013.01); *H04N 5/2259* (2013.01)

(58) Field of Classification Search
CPC .................................................. G02B 17/0832
USPC .......................................................... 359/634
See application file for complete search history.

(56) References Cited

U.S. PATENT DOCUMENTS

| | | |
|---|---|---|
| 5,612,821 A | 3/1997 | Schmutz |
| 6,433,934 B1 | 8/2002 | Reznichenko et al. |
| 6,583,937 B1 | 6/2003 | Wangler et al. |

(Continued)

OTHER PUBLICATIONS

European Search Report for European Patent Application No. 16182180.6-1562 dated Feb. 10, 2017, 7 pages.

(Continued)

*Primary Examiner* — James Jones
(74) *Attorney, Agent, or Firm* — Amin, Turocy & Watson, LLP

(57) ABSTRACT

A modular compound lens comprises an elementary unit with five powered optical elements capable of imaging a field of view of approximately 100 degrees with an F-number of 1.7. The compound lens exhibits image distortion of no more than 10% and a nearly diffraction limited modulation transfer function (MTF) of up to 100 line-pairs per millimeter. Additional optical components can be added to the compound lens to widen the field of view as desired without changing the F-number and without significant increase in image aberrations.

20 Claims, 16 Drawing Sheets

(56) References Cited

U.S. PATENT DOCUMENTS

| | | |
|---|---|---|
| 6,611,382 B2 | 8/2003 | Hashimoto |
| 6,830,189 B2 | 12/2004 | Tsikos et al. |
| 7,159,986 B2 | 1/2007 | Bremer et al. |
| 7,268,950 B2 | 9/2007 | Poulsen |
| 7,619,824 B2 | 11/2009 | Poulsen |
| 8,390,914 B2 | 3/2013 | Woodgate et al. |
| 9,360,762 B2 | 6/2016 | Tychkov |
| 2002/0024740 A1 | 2/2002 | Hashimoto |
| 2005/0237488 A1 | 10/2005 | Yamasaki |
| 2010/0283842 A1 | 11/2010 | Rami et al. |
| 2012/0057345 A1 | 3/2012 | Kuchibhotla |
| 2013/0050405 A1* | 2/2013 | Masuda ............... G02B 13/06 348/36 |
| 2015/0002664 A1 | 1/2015 | Andreas et al. |

OTHER PUBLICATIONS

European Search Report for European Patent Application No. 16182177.2-1562 dated Feb. 2, 2017, 10 pages.
Extended European Search Report for European Patent Application No. 16182180.6-1562 dated May 23, 2017, 16 pages.
Notice of Allowance for U.S. Appl. No. 14/993,601, dated Jul. 25, 2017, 23 pages.

* cited by examiner

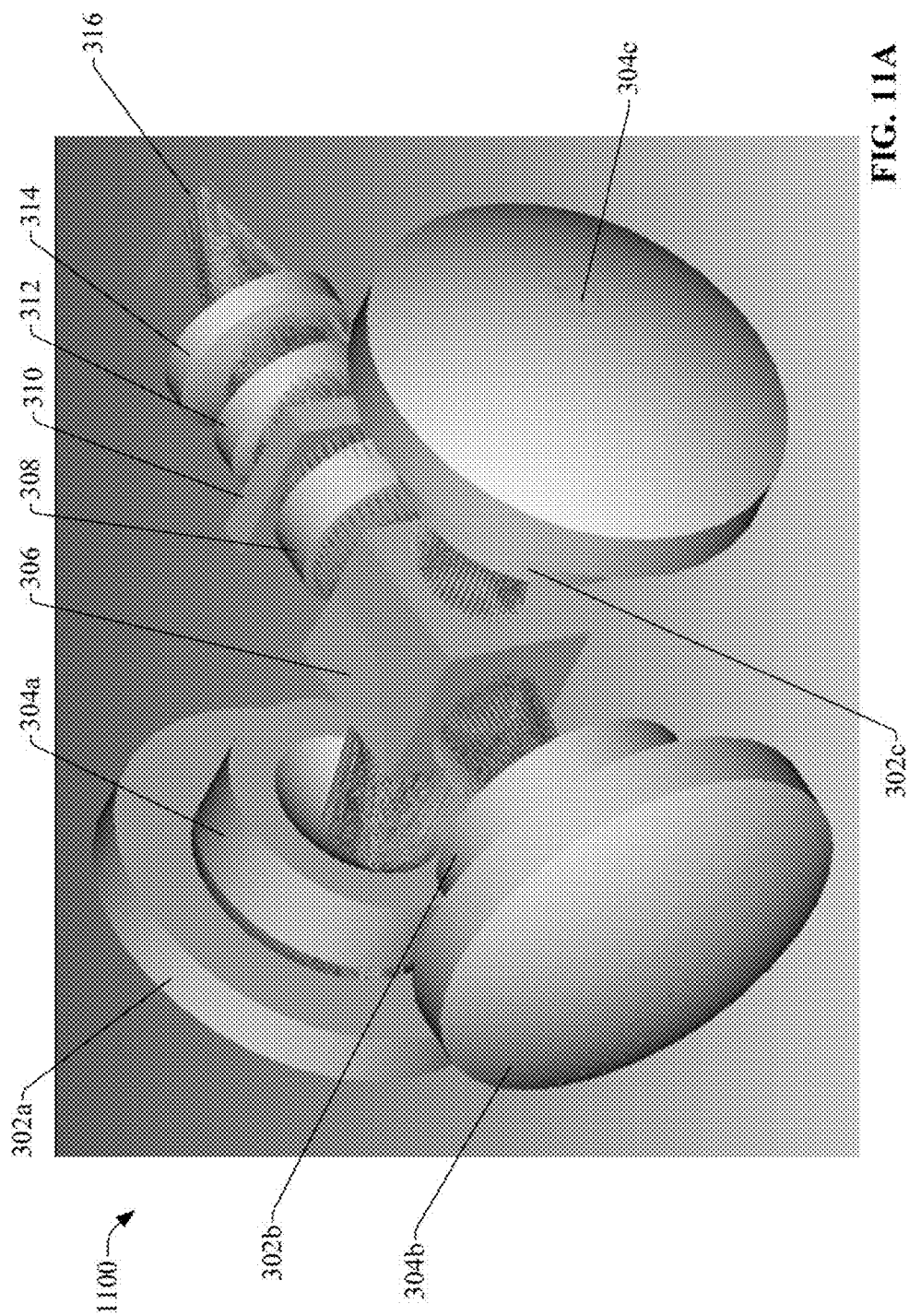

MODULAR LENS FOR EXTREMELY WIDE FIELD OF VIEW

CROSS-REFERENCE TO RELATED APPLICATIONS

This application claims priority to U.S. Provisional Application Ser. No. 62/209,716, filed on Aug. 25, 2015, and entitled "MODULAR LENS FOR EXTREMELY WIDE FIELD OF VIEW," the entirety of which is incorporated herein by reference.

BACKGROUND

The subject matter disclosed herein relates generally to imaging systems, and, more particularly, to a modular compound lens with five powered elements capable of imaging a wide field of view with little image distortion

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a compound lens is provided comprising a first primary powered optical element configured to collect and refract first light from a first field of view to yield first refracted light; a first secondary powered optical element configured to refract the first refracted light from the first primary optical element to yield second refracted light; and a combining component configured to receive the second refracted light from the first secondary powered optical element and to direct the second refracted light to one or more downstream optical elements along an optical path of the compound lens, wherein the compound lens images a field of view of at least 100 degrees.

Also, one or more embodiments provide a method for collecting and focusing light from a wide field of view, comprising refracting, by a first primary powered optical element of a compound lens, first light from a first field of view to yield first refracted light; refracting, by a first secondary powered optical element of the compound lens, the first refracted light from the first primary optical element to yield second refracted light; providing the second refracted light from the first secondary powered optical element to a combining component of the compound lens; and directing, by the combining component, the second refracted light to one or more downstream optical elements along an optical path of the compound lens, wherein the compound lens images a field of view of at least 100 degrees.

Moreover, according to one or more embodiments, a system for imaging a wide field of view is provided, comprising means for refracting first light received at a compound lens from a first field of view to yield first refracted light; means for refracting the first refracted light to yield second refracted light; and means for directing the second refracted light to one or more downstream optical elements along an optical path of the compound lens, wherein the means for refracting the first light, the second means for refracting the first refracted light, the means for directing, and the one or more downstream optical elements image a field of view of at least 100 degrees.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 11A is a three-dimensional full view of an example modular compound lens that adds second and third primary-secondary pairs to the elementary unit of the compound lens.

DETAILED DESCRIPTION

Figure 1:
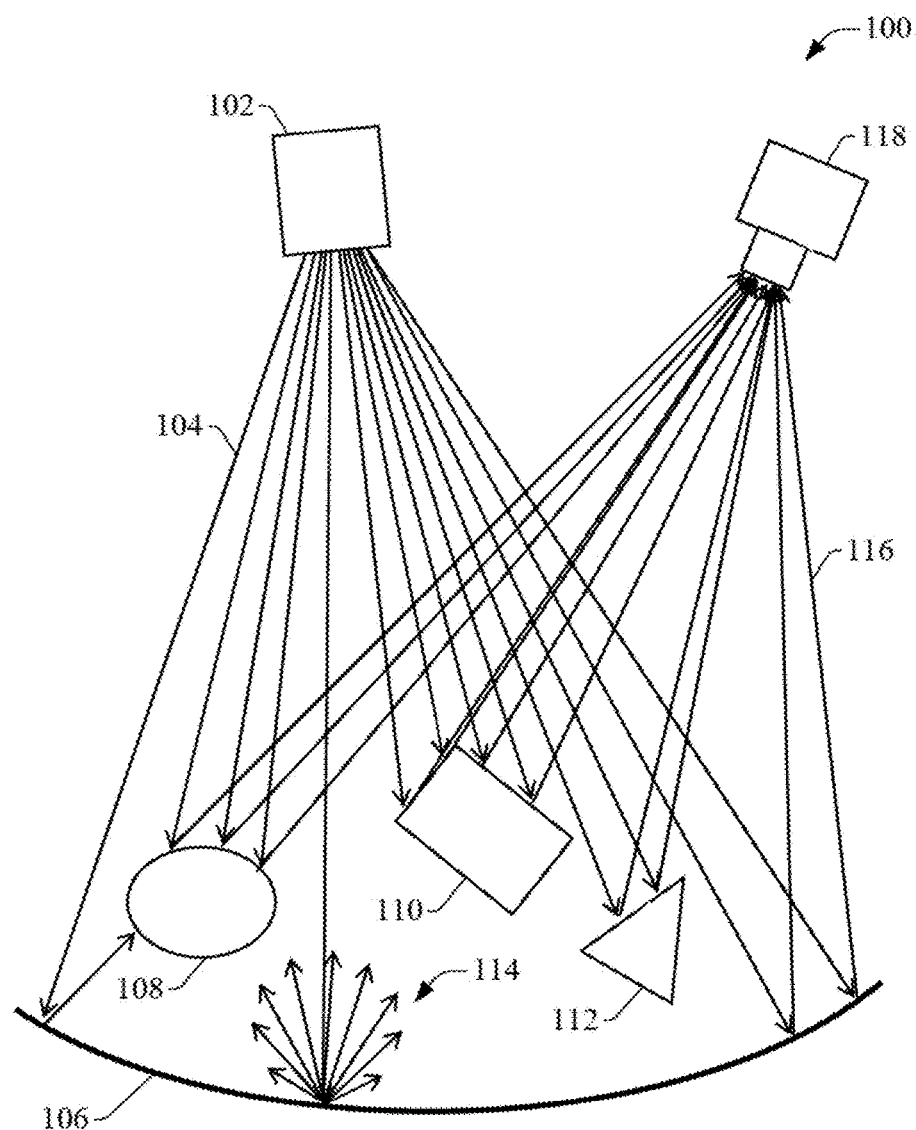
FIG. 1 is a diagram illustrating capture of an image by an example, non-limiting illumination and imaging system, which comprises an illuminator and an imaging system.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a simplified diagram illustrating capture of an image by an example, non-limiting illumination and imaging system 100, which comprises an illuminator 102 and an imaging system 118. Illuminator 102 and imaging system 118 can be, for example, components of a commercial camera or a more specialized camera such as a multi-spectral or hyper-spectral imaging camera, or may be components of a time-of-flight (TOF) camera (also known as a three-dimensional image sensor) capable of generating distance information for points within the viewing field. In this example, the system includes both imaging system 118 that records an image based on light scattered from a viewing field as well as an integrated illuminator 102 that casts light 104 into the viewing field. However, some systems may not use an illuminator, but instead may collect image information using only the ambient light available within the viewing field.

If illuminator 102 is used, the illuminator 102 emits light 104 into a viewing area to be imaged. Portions of the emitted light that are incident on solid objects and surfaces within the field of view—such as solid bodies 108, 110, and 112 and wall 106—are scattered by the illuminated objects and surfaces as scattered rays 114. Subsets of the scattered rays 116 are received and collected by a lens of the imaging system 118, and image capturing components within the imaging system 118 (e.g., a photodiode array, a charged-coupled device, a complimentary metal-oxide semiconductor, photographic film or emulsion, etc.) record the rays 116 scattered from the objects and surfaces as an image (or as a set of point cloud data in the case of three-dimensional imaging systems). Alternatively, if an illuminator is not used, the lens of the imaging system 118 instead collects and focuses ambient light scattered from the objects and surfaces within the lens's field of view.

The extent of the imaging system's field of view is a function of the type of lens used to collect and focus the scattered light. Wide fields of view typically require compound lenses, or lens assemblies made up of multiple simple lenses. While many lenses are capable of producing a clear high resolution image, images produced from lens-focused light commonly contain aberrations, or image distortions that are a function of the geometry and the material of the lens used to produce the image. These aberrations typically increase at the edges of the lens's field of view. In order to compensate and balance optical aberrations, compound lens designers often select combinations of optical elements having dioptric power and dissimilar refractive characteristics.

Typically, as the desired field of view increases, so must the number of lens elements that make up the compound lens increase. For example, a Cooke lens is a triplet lens comprising a negative flint glass element arranged between two crown glass elements. The field of view produced by this configuration is limited to a certain maximum angle (e.g., 40 degrees). In order to increase the angle of the field of view beyond this maximum of which the Cooke triplet is capable, a fourth element must be added. One example of such a lens, a Tessar lens, comprises four optical elements—two crown glass elements and two flint glass elements. This configuration yields a wider field of view relative to the Cooke lens. Although Cooke and Tessar lenses were superseded by more advanced lenses, both lenses have seen a renewed increase in popularity with the advent of mobile-phone cameras.

Figure 2:
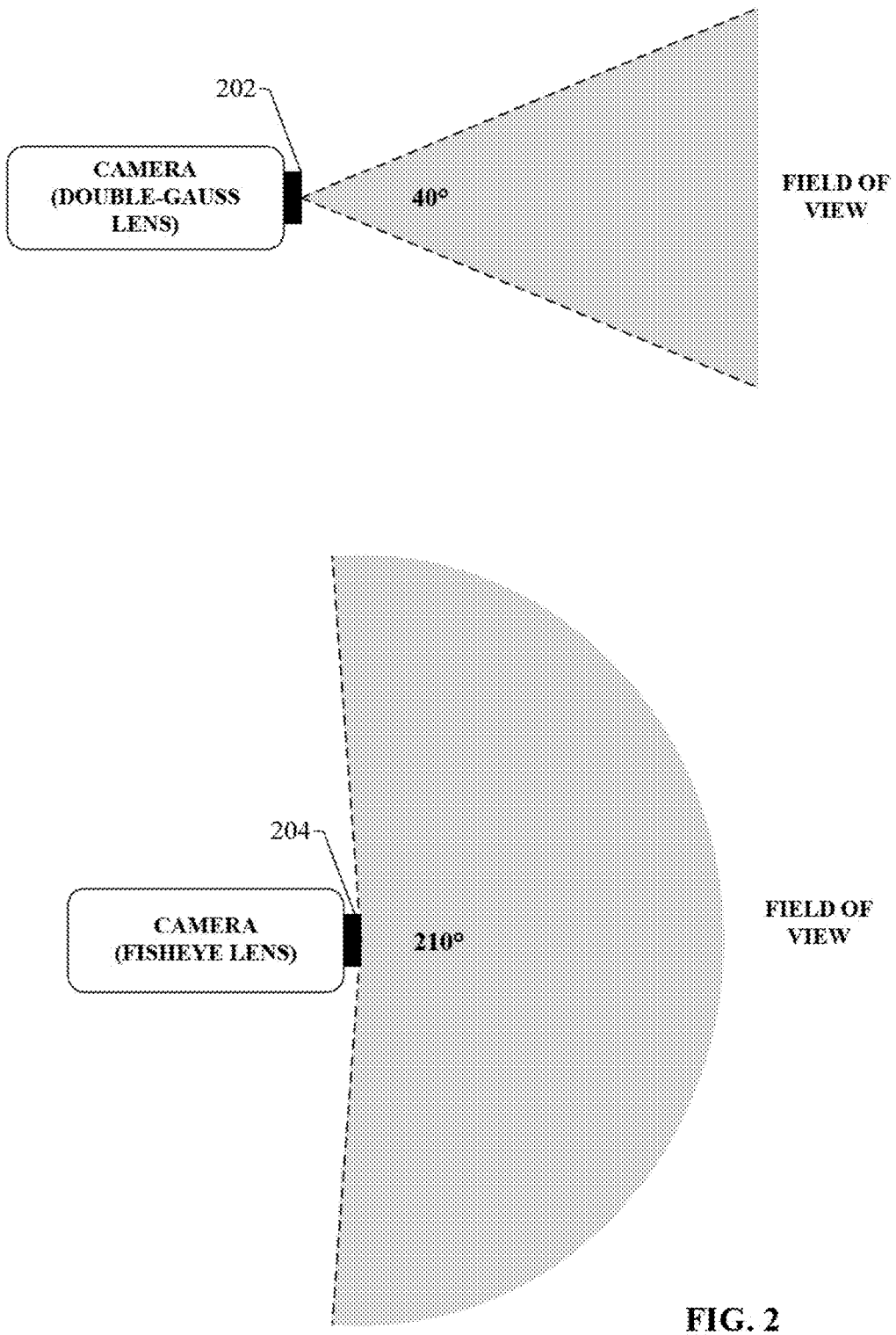
FIG. 2 is a diagram illustrating an example field of view provided by a double-gauss lens and a fisheye lens.

The F-number of a lens determines the lens's entrance pupil. The ability of the lens to collect luminous or radiant flux is inversely proportional to the square of the lens's F-number. Consequently, cameras within a low illumination environment require a low F-number. Increasing the field of view while keeping the F-number constant requires an increase in the number of lens elements. However, increasing the number of elements often results in a commensurate increase in image aberrations, thus compromising the image quality. For example, as illustrated in FIG. 2, a double-Gauss lens 202 can achieve a field of view of approximately 40 degrees, while a fisheye lens 204 can yield a much wider 210 degree field of view. However, although transitioning from a double-Gauss lens to a fisheye lens increases the field of view, this increase comes at the cost of greater image distortion due in part to the greater number of optical elements that make up the fisheye lens.

One or more embodiments of the present disclosure provide a modular compound lens comprising an elementary unit with five powered optical elements that image a field of view onto a focal plane for capture by a sensor. The modular compound lens can image a field of view of approximately 100 degrees with an F-number of as low as 1.7. The compound lens exhibits a distortion of no more than 10% and a nearly diffraction limited modulation transfer function (MTF) of up to 100 line-pairs per millimeter (lp/mm). In some embodiments, this low level distortion can be attenuated or corrected by a mapping algorithm executed by the imaging system's processor, or using a look-up table stored on the imaging system. Additional optical elements can be added in a modular fashion to the elementary unit of the compound lens to widen the field of view as desired without changing the F-number and without significant increase in image aberrations.

Figure 3:
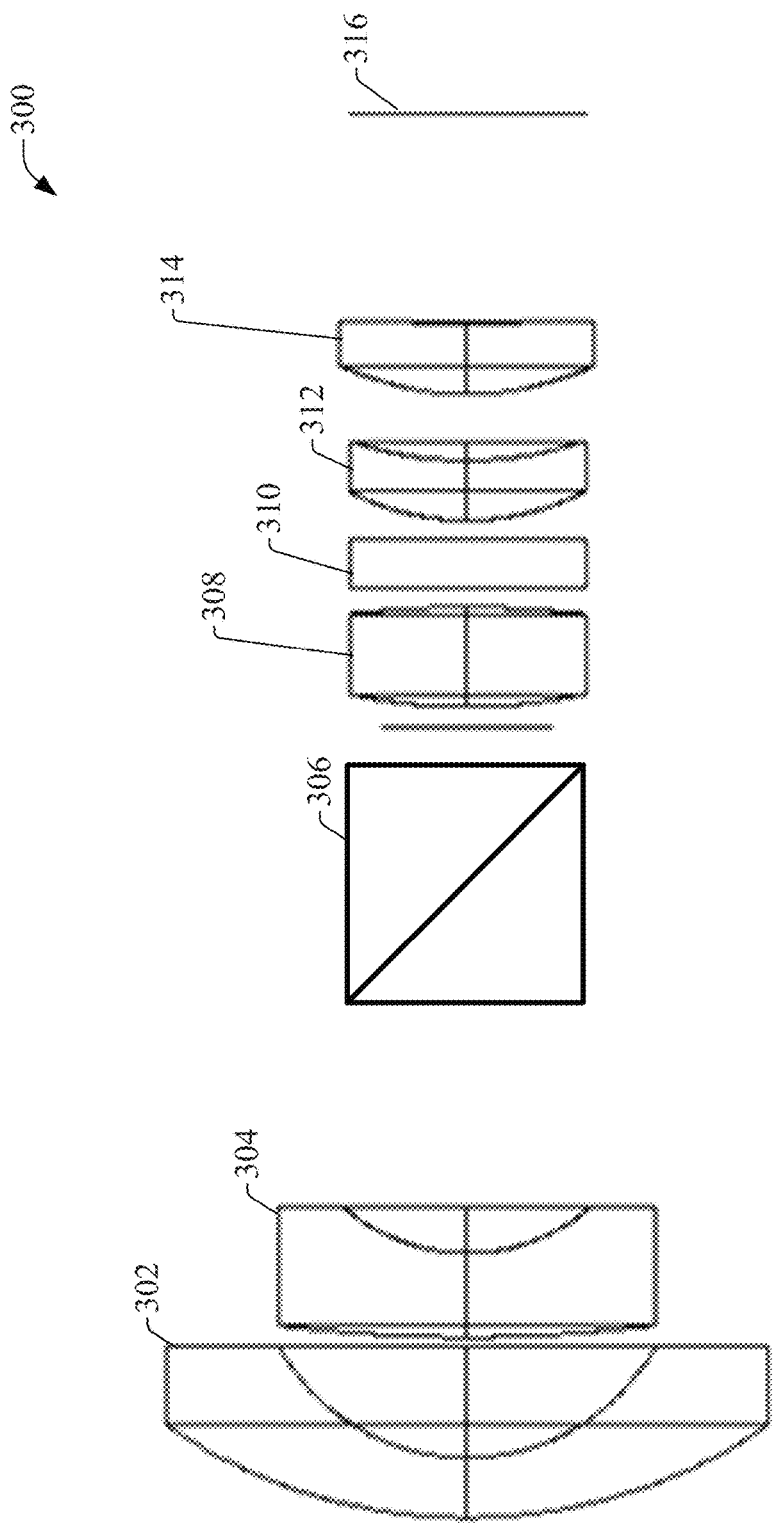
FIG. 3 is a diagram of an elementary unit of an example modular compound lens comprising five powered elements.

FIG. 3 is a diagram illustrating a modular compound lens 300 according to one or more embodiments. Compound lens 300 comprises five powered optical elements aligned to form an optical path—a primary element 302, a secondary element 304, a tertiary element 308, a quaternary element 312, and a quinary element 314. Compound lens 300 also comprises a non-powered combiner 306 behind the secondary powered element 304 within the optical path, and a filter 310 set behind the tertiary element 308. As will be described in more detail below, combiner 306 can be used to increase the angle of the viewing field in a modular fashion while maintaining a low level of image aberration. In the example illustrated in FIG. 3, the optical elements of compound lens 300 focus light scattered from an object or plural objects in the field of view to a sensor 316 of an imaging system (e.g., a camera, a spectral imaging system, a 3D imaging system, etc.) in order to produce an image of the object(s) in the viewing field. Primary element 302 collects light rays scattered from objects and surfaces within the field of view of the entire compound lens 300, where the collected rays comprise a fraction of all rays scattered from the objects and surfaces. Secondary element 304 transmits rays from the primary element, bending and further transmitting the rays to the other powered elements 308, 312, and 314 via combiner 306 and filter 310. Each powered element refracts the light and transmits the light to the next element in the optical path. The powered elements of compound lens 300 collectively focus the rays to sensor 316, which captures an image of the field of view based on the focused light incident on its surface. The sensor 316 may comprise, for example, a photodiode array, a charged-coupled device (CCD) or complimentary metal-oxide semiconductor (CMOS), photographic film or emulsion, or another type of image recording means.

Figure 4:
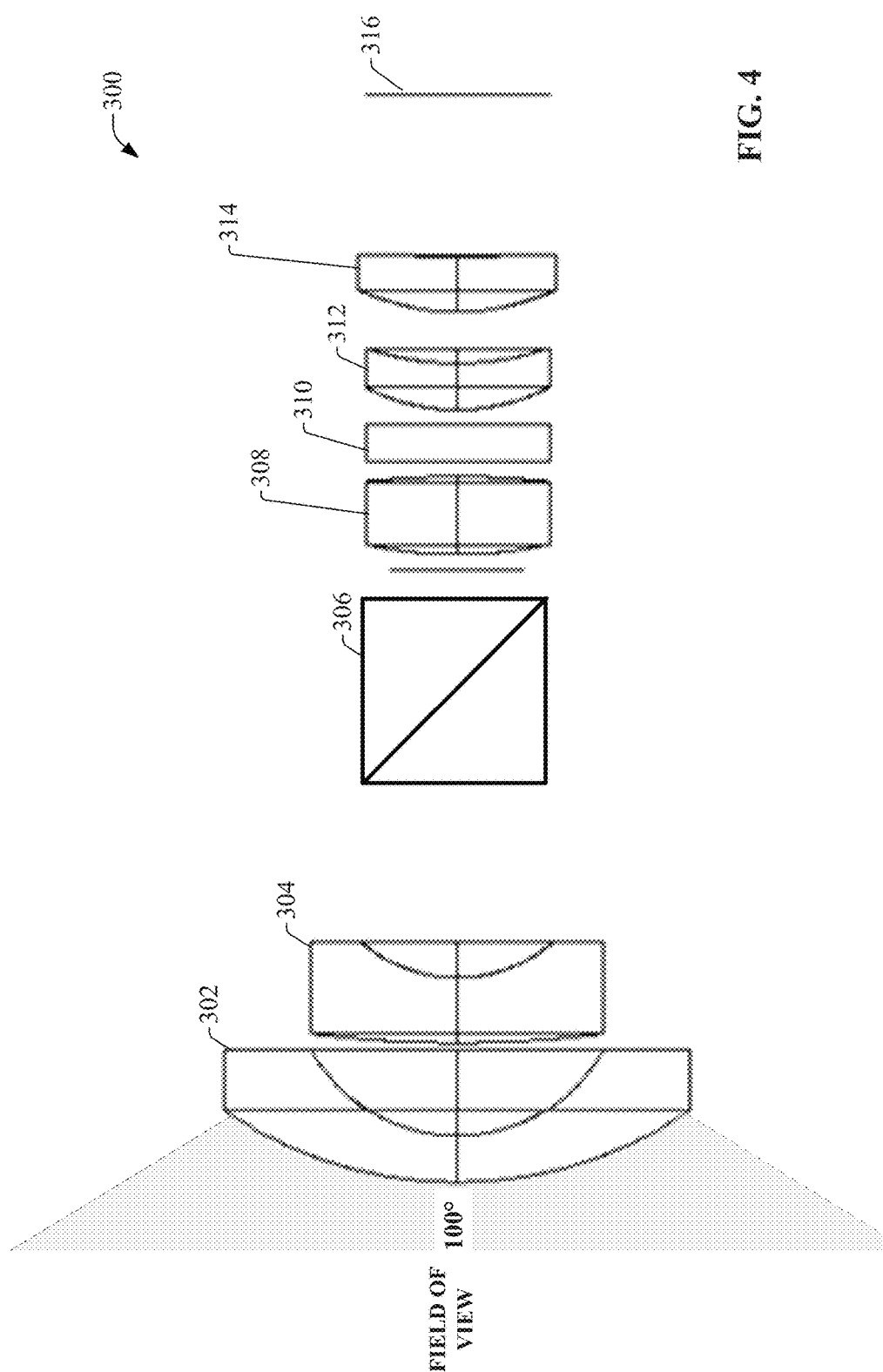
FIG. 4 is a diagram of an example modular lens that images a field of view of approximately 100 degrees.

In various embodiments, the five powered elements 302, 304, 308, 312, and 314 can comprise any suitable combination of lens types, including but not limited to plano-convex lenses, positive and/or negative meniscus lenses, biconcave lenses, biconvex lenses, etc. The powered elements can comprise any suitable type of optical material, including but not limited to crown glass or flint glass, crystals, polymers, etc. Also, one or more of the refractive lens elements may be replaced by diffractive elements, such as binary lenses or holographic optical elements, without departing from the scope of one or more embodiments of this disclosure. As shown in FIG. 4, one or more embodiments of compound lens 300 is capable of imaging a wide angle field of view of approximately 100 degrees (e.g., 100×100 degrees), with an F-number of 1.7. Image distortion is no greater than 10%, and the compound lens 300 exhibits a nearly diffraction limited MTF up to 100 lp/mm. In some embodiments, this distortion can be further reduced using software executed by the imaging system associated with the lens (e.g., a mapping algorithm, a look-up table, etc.).

Figure 5:
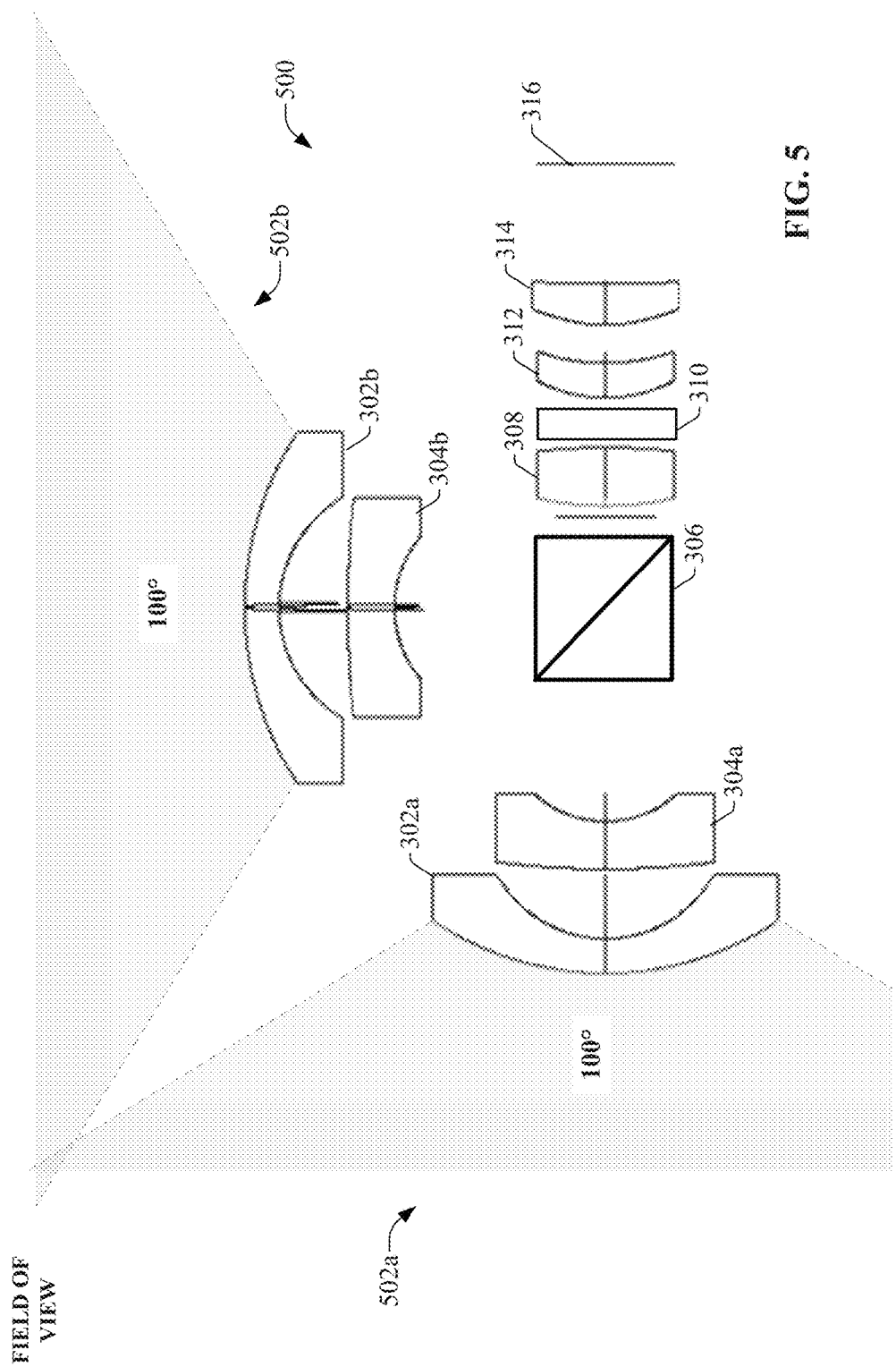
FIG. 5 is a diagram of an example compound lens comprising two primary-secondary pairs.
Figure 6:
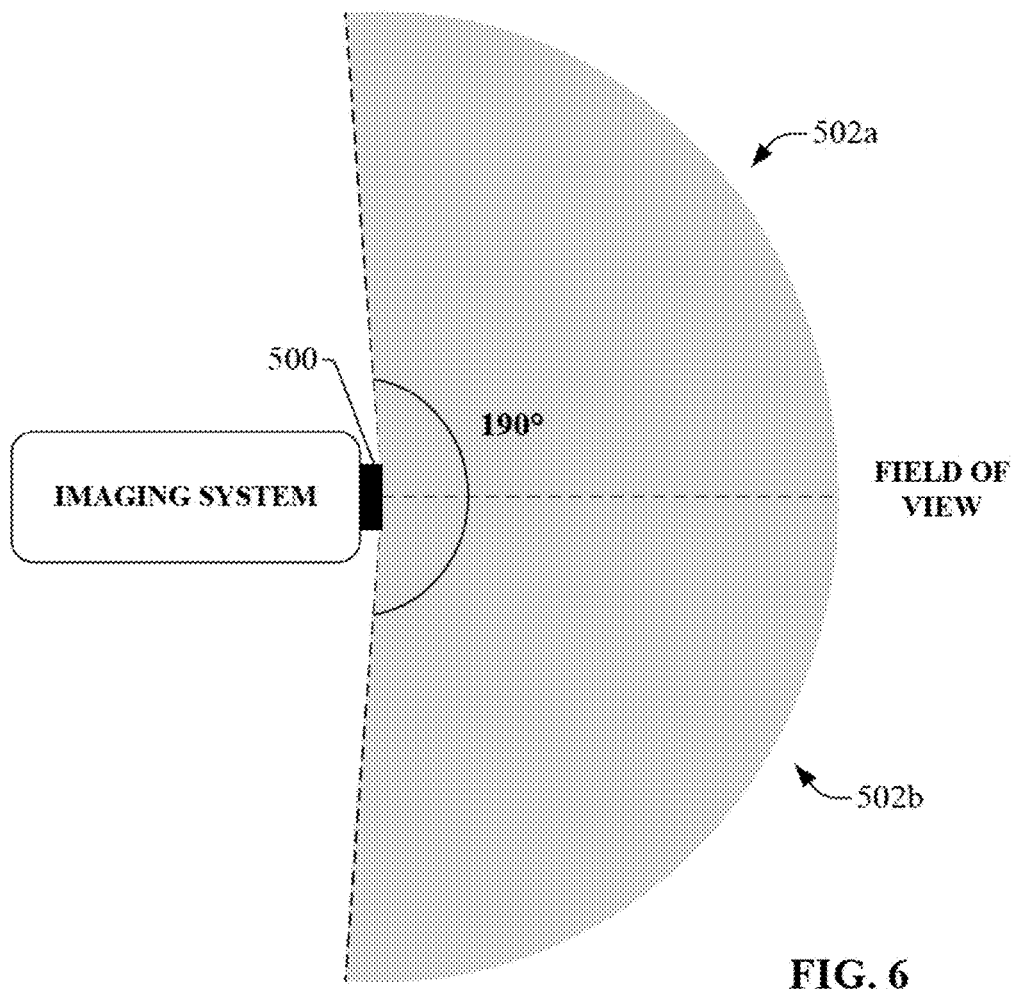
FIG. 6 is a diagram illustrating the composite field of view obtained by a modular compound lens by combining two fields of view.

The optical elements illustrated in FIGS. 3 and 4 collectively make up an elementary unit of the compound lens 300. The elementary unit serves as a basic compound lens to which additional modular components can be added in order to increase the field of view. For example, the field of view provided by the compound lens can be doubled to approximately 200 degrees (e.g., 100×200 degrees) by adding a second primary element 302 and a second secondary element 304. In embodiments in which the combination is accomplished orthogonally (the two fields of view being at an angular separation of 90 degrees), the combined field of view becomes 190 degrees. FIG. 5 is a diagram of an example compound lens 500 that images a field of view at an angle of 190 degrees. In this example, the elementary unit of compound lens 500 comprises a primary element 302a, a secondary element 304a, a combiner 306, a tertiary element 308, a filter 310, a quaternary element 312, and a quinary element 314, which are similar to the corresponding powered elements of compound lens 300. In order to nearly double the angle of the field of view, a second primary element 302b and a second secondary element 304b have been added to the elementary unit of the compound lens 500. Primary element 302a focuses light to secondary element 304a, while primary element 302b focuses light to secondary element 304b. Thus, primary element 302a and secondary element 304a make up a first primary-secondary pair, and primary element 302b and secondary element 304b make up a second primary-secondary pair. The second primary-secondary pair—made up of elements 302b and 304b—is positioned at 90 degrees relative to the first primary-secondary pair symmetrically about the combiner 306, which combines the optical rays from both of the primary-secondary pairs for traversal through the other elements 308, 310, 312, and 314. Each of the two primary-secondary pairs can image a field of view of approximately 100 degrees. Consequently, orienting the two primary-secondary pairs at 90 degrees to one another effectively doubles the width of the field of view to approximately 190 degrees (e.g., nearly 100×200 degrees) by combining the two fields of view 502a and 502b collected by the respective primary-secondary pairs. FIG. 6 is a diagram illustrating the composite field of view obtained by compound lens 500 by combining the two fields of view 502a and 502b received via the two primary-secondary pairs.

The addition of the second primary-secondary pair, and the corresponding doubling of the field of view, does not change the F-number of the compound lens 500, which remains 1.7. Moreover, the addition of the second primary-secondary pair does not affect the observed aberrations, and thus the image distortion and the MTF remain unchanged relative to compound lens 300 when the second primary-secondary unit is added.

In various embodiments, combiner 306 can comprise any suitable optical or electromechanical component for combining the optical rays from the two fields of view 502a and 502b provided by the two primary-secondary pairs. For example, in one or more embodiments, compound lens 500 may be configured to differentiate the two fields of view using different wavelengths or colors. In such embodiments, combiner 306 may be a dichroic beamsplitter cube configured to combine the differently colored rays received from the secondary elements 304a and 304b. According to an example technique, compound lens 500 may include one or more spectral filters that transmit light from each of the two fields of view 502a and 502b corresponding to the wavelengths at which the two fields of view are illuminated prior to transmission to the combiner 306, such that the wavelengths present in each of the two fields of view reside in two separate color ranges. FIG. 5 depicts an embodiment in which a spectral filter 310 is set behind the combiner 306. An advantage of setting spectral filter 310 behind combiner 306 is that such embodiments only require a single filter having a transmission spectrum compatible with the two wavelengths of interest. Such a spectral filter 310 can be placed anywhere behind combiner 306 relative to the powered elements (that is, between any two of the tertiary, quaternary, and quinary elements, or between combiner 306 and tertiary element 308). Combiner 306 can comprise a dichroic beamsplitter cube configured to transmit light within a first wavelength range of the first field of view 502a, and to reflect light within a second wavelength range of the second field of view 502b. Thus, when light rays from the two fields of view enter respective two adjacent sides of the dichroic beamsplitter cube (via the primary and secondary elements), both rays are projected from a third side of the beamsplitter cube as a combined beam along the optical path of the other lens elements 308, 310, 312, and 314. The dichroic beamsplitter cube can be configured to combine either monochromatic rays or polychromatic rays, provided the signature colors of light coming from the two fields of view are disparate so that the combiner 306 can differentiate between the two fields of view.

In another example embodiment, compound lens 500 can use polarization diversity of the two fields of view 502a and 502b to facilitate combining the two fields of view. In such embodiments, combiner 306 can be a polarizing beamsplitter cube configured to combine the diversely polarized light from the two fields of view. For example, compound lens 500 can be configured to polarize light received from the first field of view 502a in a first direction before the light reaches combiner 306 (e.g., using a polarization filter placed within the optical path prior to the combiner 306, or using other polarizing means). Likewise, the compound lens 500 can be configured to polarize light received from the second field of view 502b in a second, different direction before the light reaches the combiner 306, thereby diversifying the polarity of the light from the two fields of view. The combiner 306, embodied as a polarizing beamsplitter cube or another component configured to combine two or more light beams with different polarities, can be configured to reflect light of the first polarity and to transmit light of the second polarity. Consequently, by directing the beams from the two fields of view onto two adjacent faces of the polarization beamsplitter cube, the beams are combined and directed from a third face of the beamsplitter cube along the optical path of the other elements 308, 310, 312, and 314.

For embodiments that use the beamsplitting techniques described above to combine optical rays from the two fields of view, the compound lens 500 can separate the optical rays for the two fields of view using a second complimentary beamsplitter disposed downstream from the quinary element 314. For example, for embodiments in which the two fields of view 502a and 502b are combined using a dichroic beamsplitter cube, a second dichroic beamsplitter having the same cut-off wavelength as the combiner 306 can be disposed within the compound lens downstream from the quinary element 314. The second dichroic beam splitter can receive the combined beam and separate the color-differentiated light information for the two fields of view; e.g., by transmitting the optical rays for the first field of view based on its first color signature and reflecting the optical rays for the second field of view based on its second color signature. The image processing components can then process the separated beams to yield image data for the two fields of view and combine the resulting image data into a composite, wide-angle image. Similarly, for embodiments in which the combiner 306 is a polarizing beamsplitter cube, the optical rays for the two fields of view can be separated using a second polarizing beamsplitter cube that receives the combined beam from the quinary element 314. The second polarizing beamsplitter cube can separate the light information from the combined beam based on the differentiated light polarities of the two fields of view.

In one or more embodiments, as an alternative to the beamsplitting techniques described above, combiner 306 may combine the beams from the two fields of view 502a and 502b by time-interleaving the acquisition of the beams from the two primary-secondary pairs. In such embodiments, the combiner 306 may comprise an electromechanical mechanism such as a steering mirror, an opto-electric valve, or other device capable of selectively passing one or the other of the light beams from the two fields of view to the other optical elements 308, 310, 312, and 314. The combiner 306 combines the two fields of view by alternating between the two beams according to a timing sequence known by image processing components associated with the imaging system's sensor, thereby sending optical rays from the two fields of view down the same optical path in a time-interleaved fashion. The image processing components downstream from the quinary element 314 (e.g., a CCD, CMOS, etc.) can then read the time-interleaved optical rays for the two fields of view synchronously with the combiner in order to separate the two sets of data contained in the combined beam.

In yet another embodiment, the combiner can be realized by a cube beamsplitter which transmits and reflects approximately half of each beam received from each field of view. Thus, about 50% of the collected rays from each field are transmitted to the sensor, while 50% are lost. In cases of abundant illumination, the loss may not present a problem.

Although a number of example implementations for combiner 306 have been described above (color beamsplitting, polarity beamsplitting, time-interleaving, etc.), it is to be appreciated that some embodiments of compound lens 500 can combine rays from the two fields of view using other means, or by jointly using a combination of any two or more of the light combination techniques described above.

In order to acquire the composite image from the separated field of view information, the compound lens 500 directs the separated beam information to one or more recording devices of an imaging system, such as a solid state sensor (e.g., a photodiode array, CCD, or CMOS), photographic film or emulsion, etc. Various embodiments of compound lens 500 can use any suitable technique to generate a composite image from the two fields of view while preventing image information from dissimilar fields of view from overlapping. For example, once the beams for the two fields of view have been separated from the combined beam, light processing components within the compound lens 500 can aim the two beams toward different zones of the image plane of an imaging device (e.g., a photodiode array, a CCD, CMOS, photographic film, etc.), such that the two fields of view are joined along the correct edges with minimal or no overlap between the two fields. Alternatively, the separated beams can be processed by different solid state sensors to yield image information for the two fields of view, and the image information can be joined by a software routine to yield the composite image.

Figure 7:
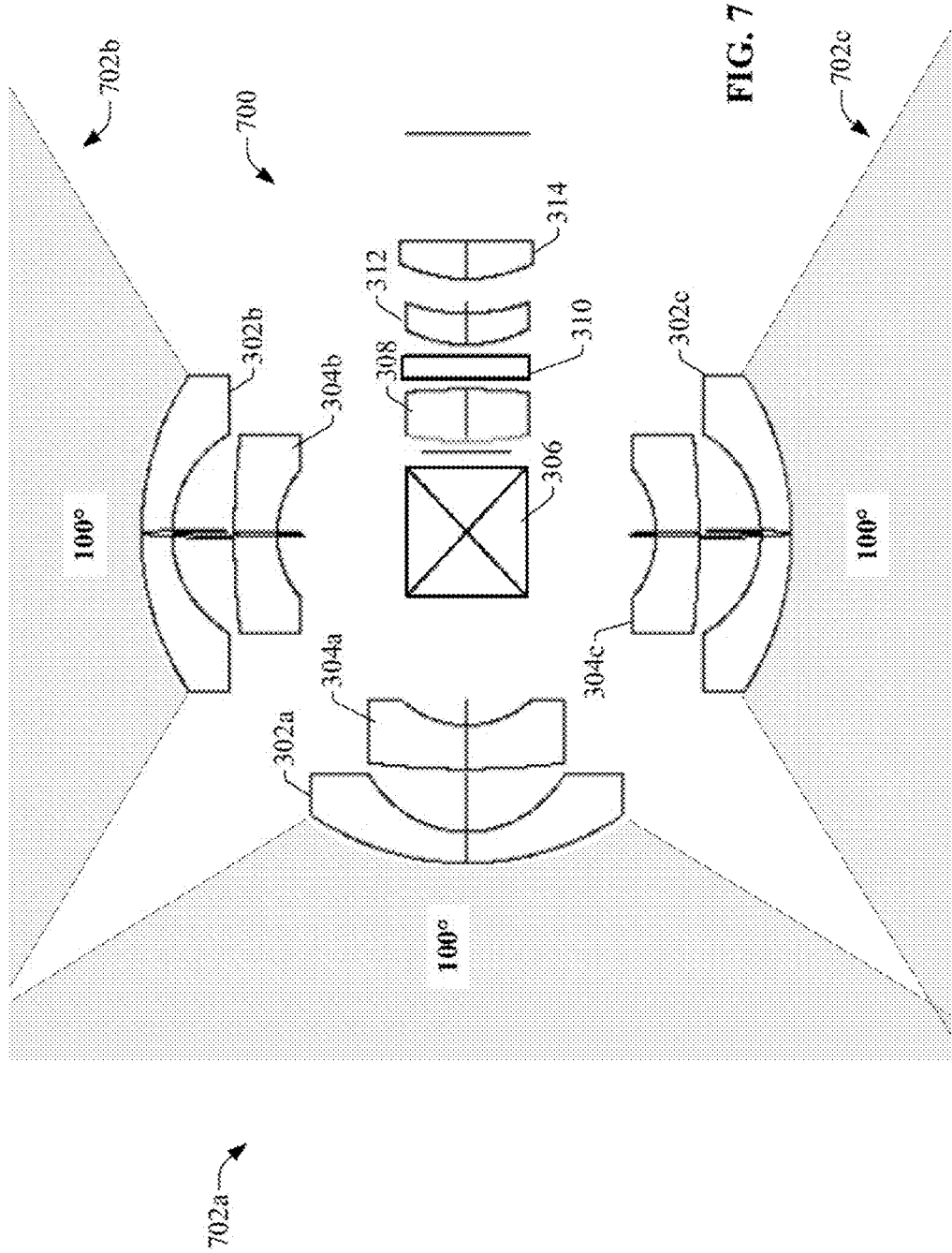
FIG. 7 is a diagram of a compound lens comprising three primary-secondary pairs.
Figure 8:
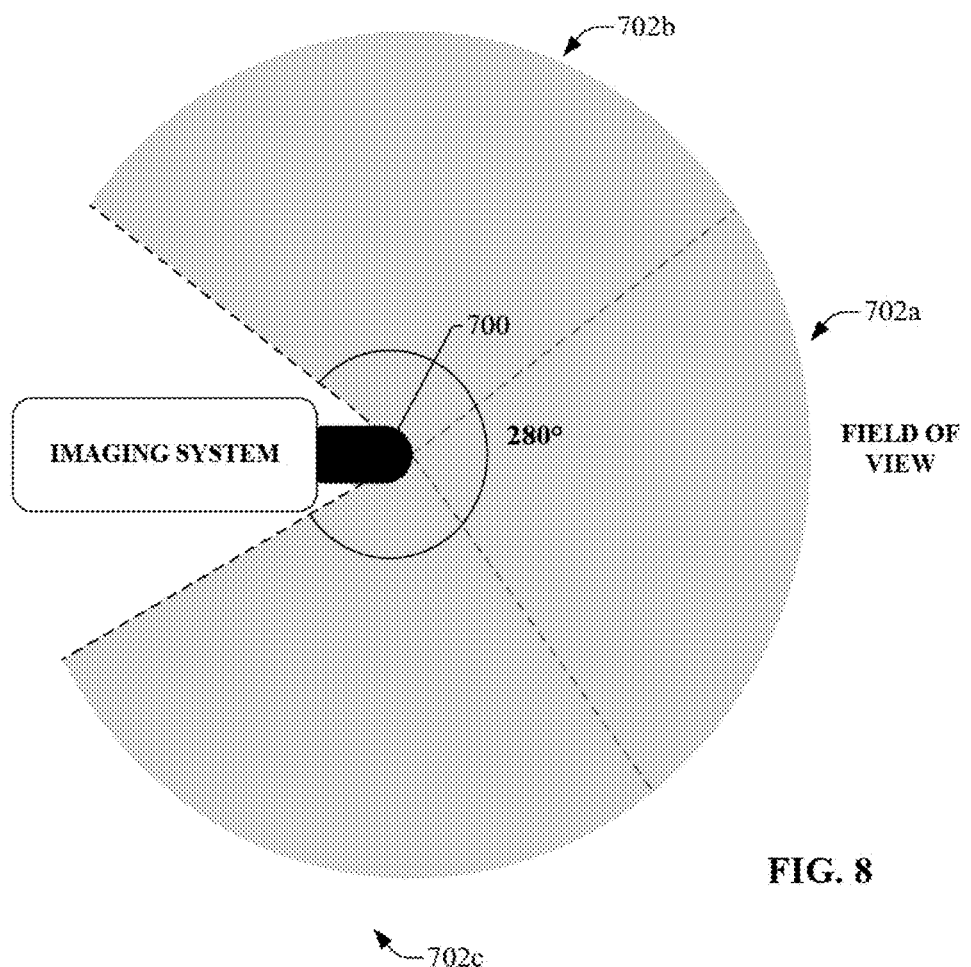
FIG. 8 is a diagram illustrating the composite field of view obtained by a modular compound lens by combining three fields of view.

The field of view provided by one or more embodiments of the compound lens described herein can be further increased to approximately 280 degrees (e.g., 100×280 degrees) by adding a third primary-secondary pair to the elementary unit. FIG. 7 is a diagram of a compound lens 700 that adds a third primary-secondary pair—comprising a third primary element 302c and a third secondary element 304c—to the compound lens design depicted in FIG. 5. The third primary-secondary pair is positioned −90 degrees to the first primary-secondary pair (comprising primary element 302a and secondary element 304a) symmetrically about combiner 306. As with the addition of the second primary-secondary pair, addition of the third primary-secondary pair does not detrimentally affect the F-number, distortion, or MTF of the resulting wide-angle image relative to compound lenses 300 and 700. FIG. 8 is a diagram illustrating the composite field of view obtained by compound lens 700 by combining the three fields of view 702a, 702b, and 702c received via the three primary-secondary pairs.

Similar to compound lens 500, light from the three fields of view 702a-702c can be aggregated by combiner 306, which then directs the aggregated optical rays to the other elements 308, 310, 312, and 314 along the optical path of the lens. For embodiments that include a third primary-secondary pair, both chromatic diversification (e.g., using a dichroic beamsplitter as the combiner 306) and time-interleaving mechanisms remain suitable options for combining the optical rays for the three fields of view. However, other combination techniques for combining the optical rays are within the scope of one or more embodiments of this disclosure.

The field of view offered by the compound lens described herein can be further widened and by adding one or more additional primary-secondary pairs. For example, a fourth primary-secondary pair can be added to the elementary unit facing the opposite direction relative to primary element 302a and secondary element 304a, resulting in a 360 degree field of view (e.g., 100×360 degrees). In another example configuration, the fourth primary-secondary pair can be oriented at 90 degrees relative to the other three primary-secondary pairs depicted in FIG. 7 (e.g., facing perpendicular to the other three pairs). This arrangement increases the field of view from 100×280 degrees to 190×280 degrees. In general, any combination of primary-secondary pairs can be incorporated into the compound lens in a modular fashion in any of six orientations (forward, backward, left, right upward, and downward) and combined by combiner 306 in order to achieve a desired field of view (e.g., 100×100, 100×190, 100×280, 100×360, 190×190, 190×280, 280×280, 280×360, 360×360, etc.).

Figure 9A:
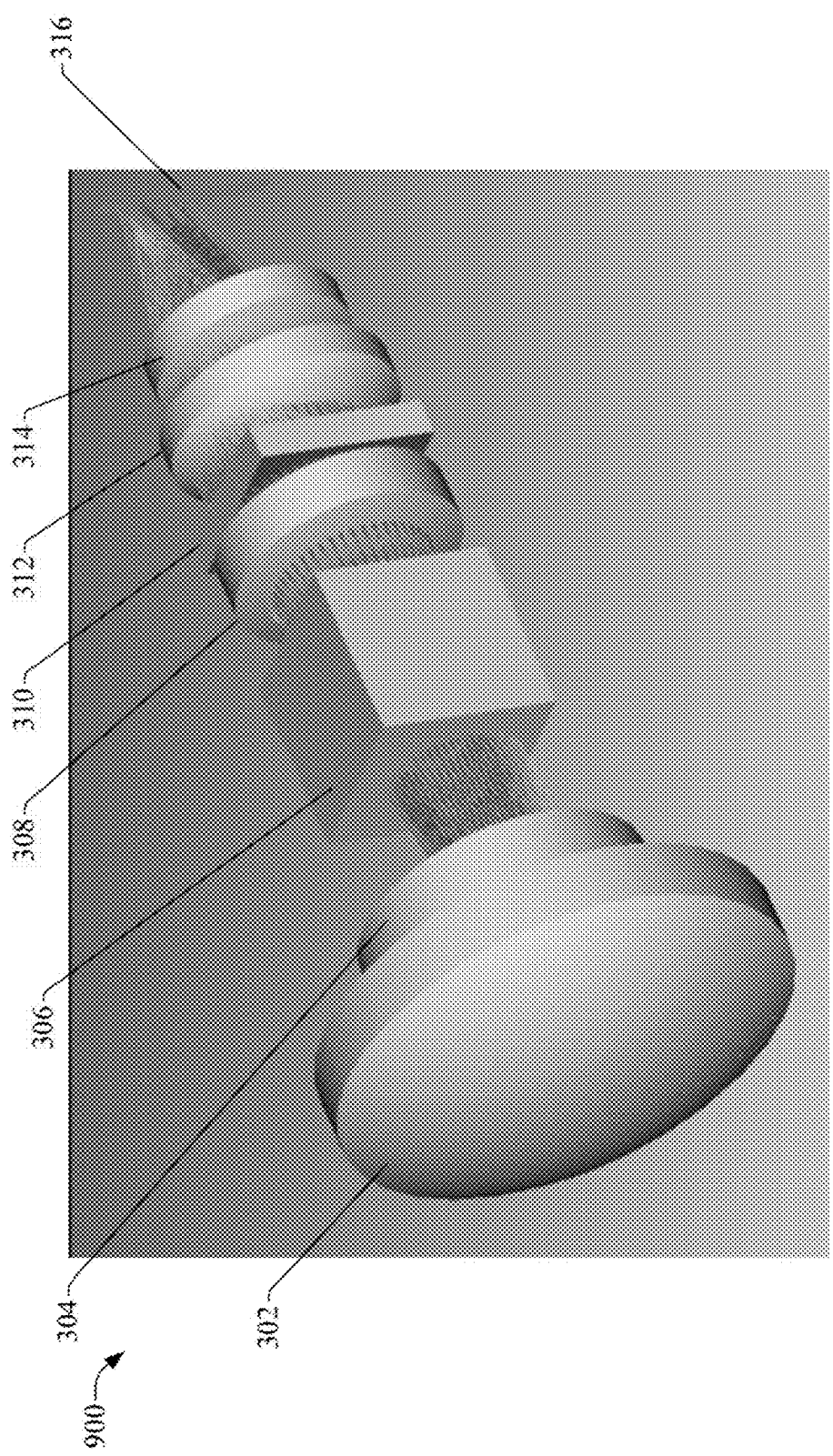
FIG. 9A is a three-dimensional full view of an elementary unit assembly for an example compound lens having a slender field of view.
Figure 9B:
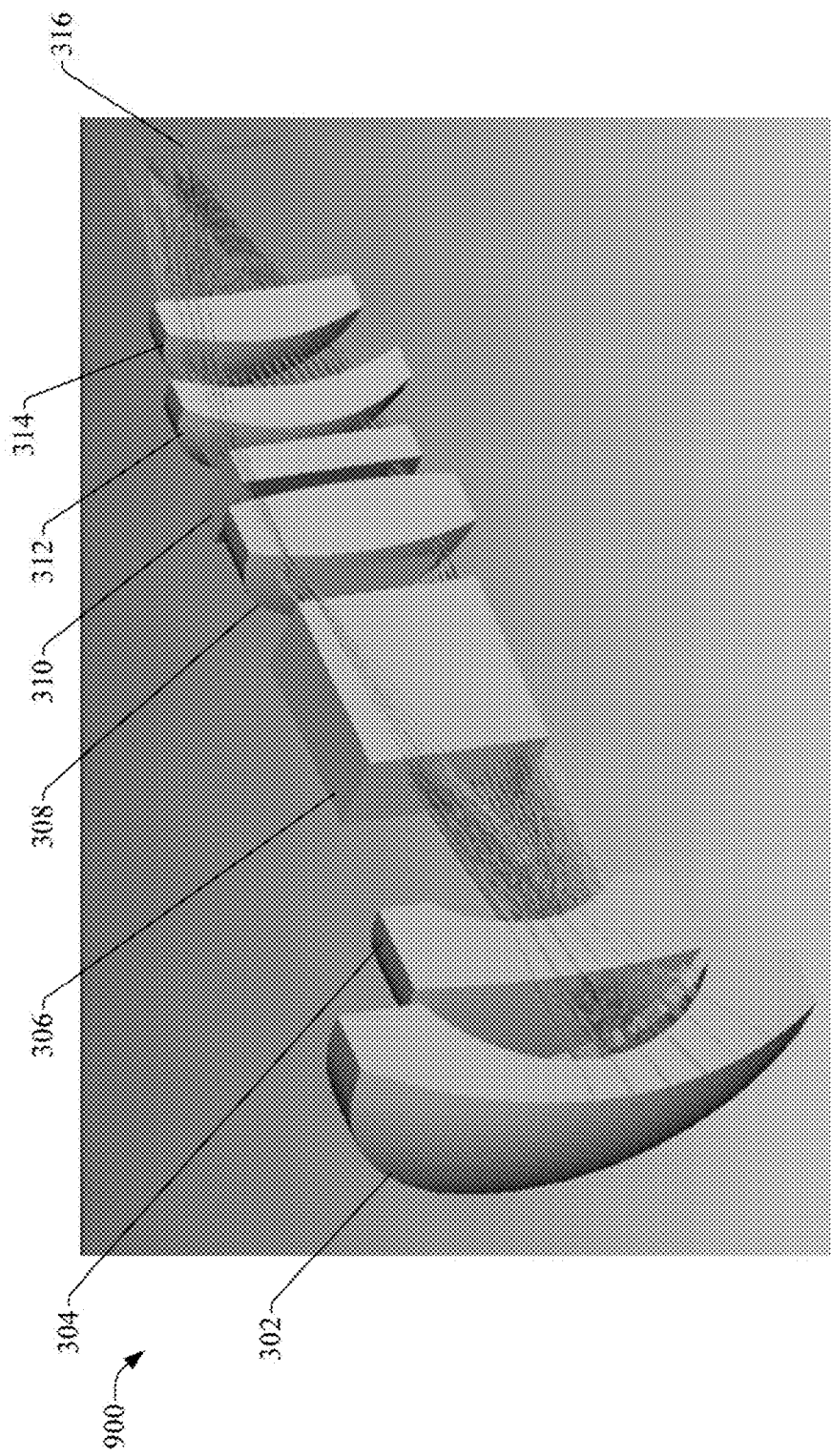
FIG. 9B is a three-dimensional cross-section view of an elementary unit assembly for an example compound lens having a slender field of view.
Figure 10:
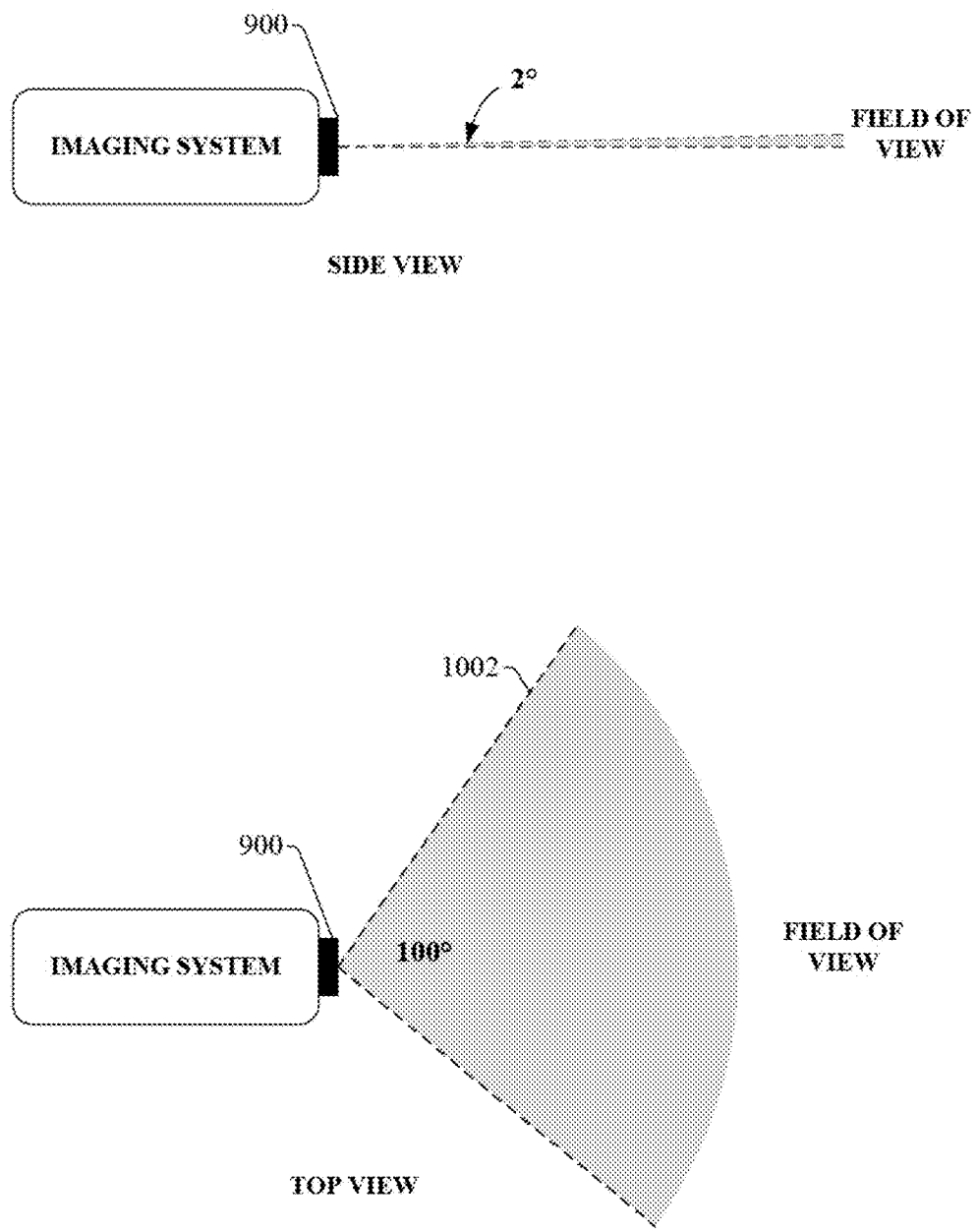
FIG. 10 is a side view and a top view illustrating the field of view for an example compound lens having a slender field of view.

FIG. 9A is a three-dimensional full view of an example assembly of components for a compound lens 900 having a slender field of view, and FIG. 9B is a three-dimensional cross-section view of compound lens 900. In one or more embodiments, compound lens 900 can yield a field of view of approximately 2×100 degrees, as shown in the top view and side view illustrated in FIG. 10 (it is to be understood that the "top view" and "side view" designations in FIG. 10 are arbitrary, and that the directions of view depend on the orientation of the lens within a given context). Similar to the compound lenses described above, compound lens 900 comprises a powered primary element 302 and a powered secondary element 304, which make up a primary-secondary pair. Compound lens 900 also comprises a combiner 306, a tertiary element 308, a filter 310, a quaternary element 312, and a quinary element 314 aligned along an optical path. The five powered elements collectively focus scattered light from the field of view to a sensor 316 or other imaging component. In this example, primary and secondary elements 302 and 304 are configured to collect and refract light from a slender 2×100 field of view, and direct the light to combiner 306.

Figure 11B:
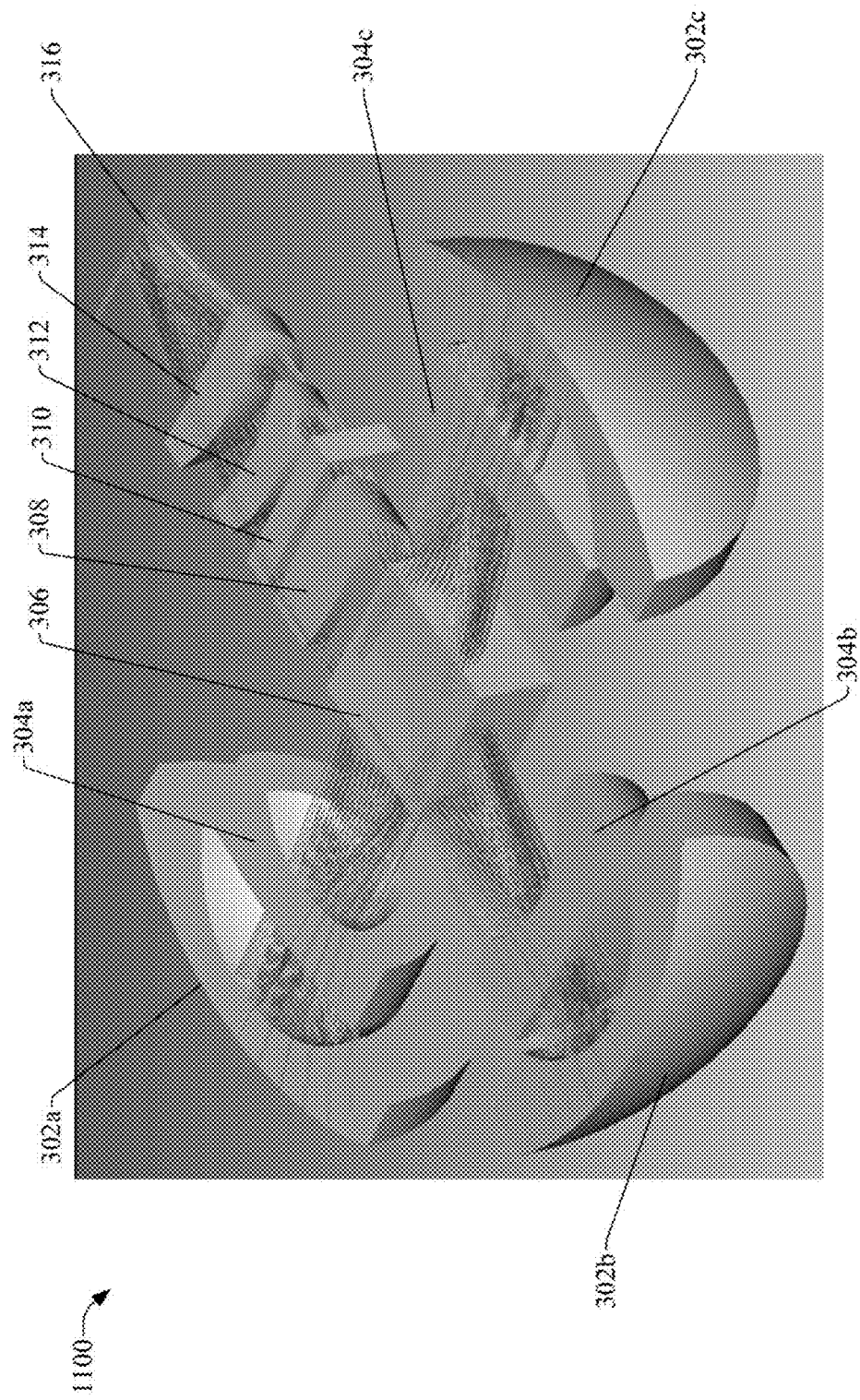
FIG. 11B is a three-dimensional cross-section view of an example modular compound lens that adds second and third primary-secondary pairs to the elementary unit of the compound lens.

As in the examples described above, the field of view can be widened by adding a second primary-secondary pair, and further widened by adding a third primary-secondary pair if desired. FIG. 11A is a three-dimensional full view of an example compound lens 1100 that adds a second and third primary-secondary pair to the elementary unit of the compound lens. The second primary-secondary pair—comprising primary element 302b and secondary element 304b—is oriented −90 degrees to the first primary-secondary pair symmetrically about combiner 306. Likewise, the third primary-secondary pair—comprising primary element 302c and secondary element 304c—is oriented 90 degrees to the first primary-secondary pair symmetrically about combiner 306 (i.e., facing the opposite direction relative to the second primary-secondary pair). Combiner 306 combines the optical rays from the three primary-secondary pairs as described in previous examples and directs the combined beam to sensor 316 via the other lens components 308, 310, 312, and 314 (of which element 310 is an unpowered filter) along the optical path of the lens. Although FIGS. 11A and 11B depict two additional primary-secondary pairs being added to the elementary unit, it is to be appreciated that more or fewer pairs can be added to the elementary unit depending on the field of view required. For example, the field of view of compound lens 1100 can be expanded from 2×280 degrees to 2×360 degrees by adding a fourth primary-secondary pair facing the opposite direction relative to the first primary-secondary pair.

Figure 12:
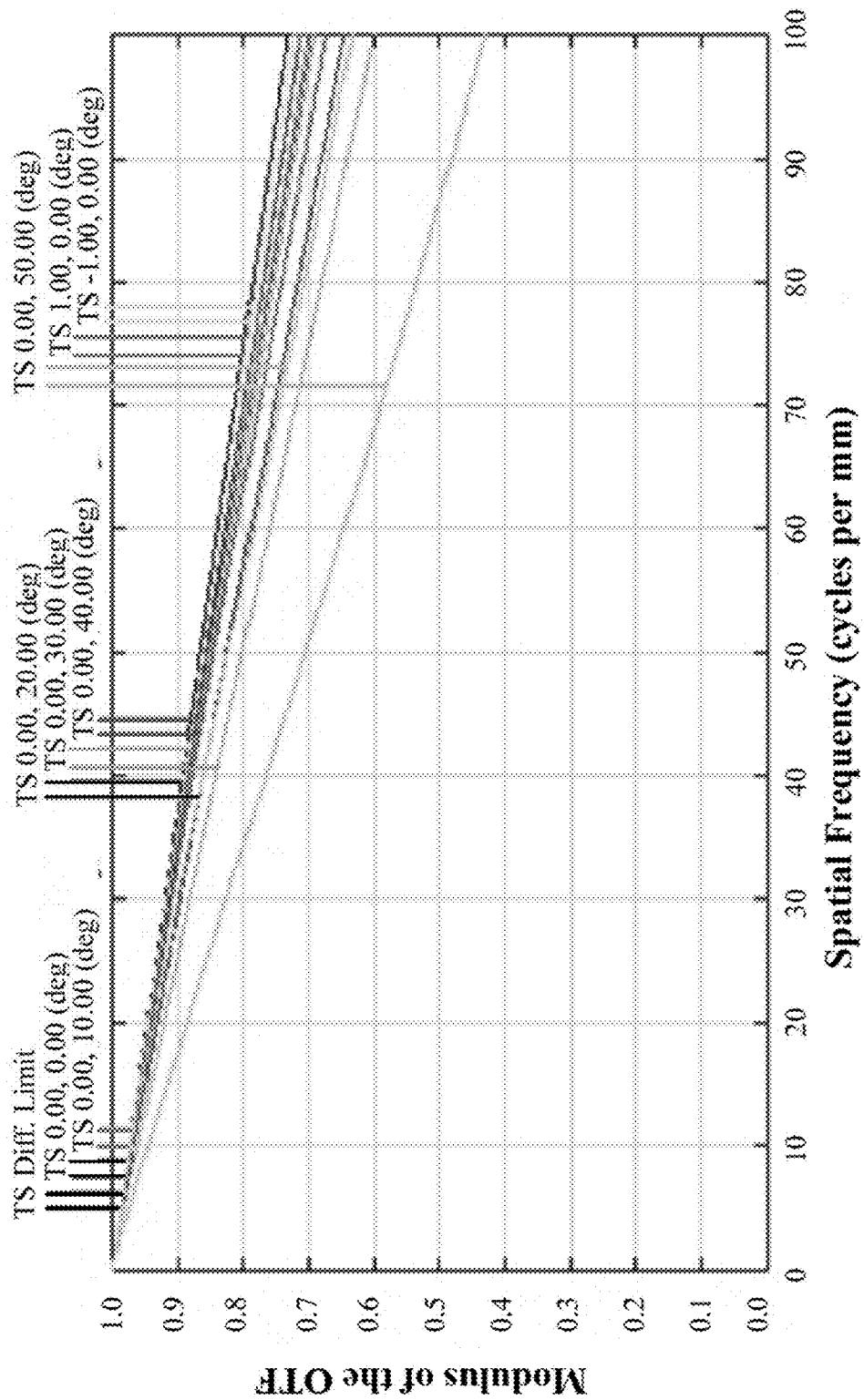
FIG. 12 is a graph plotting the MTF for an example modular compound lens.
Figure 13:
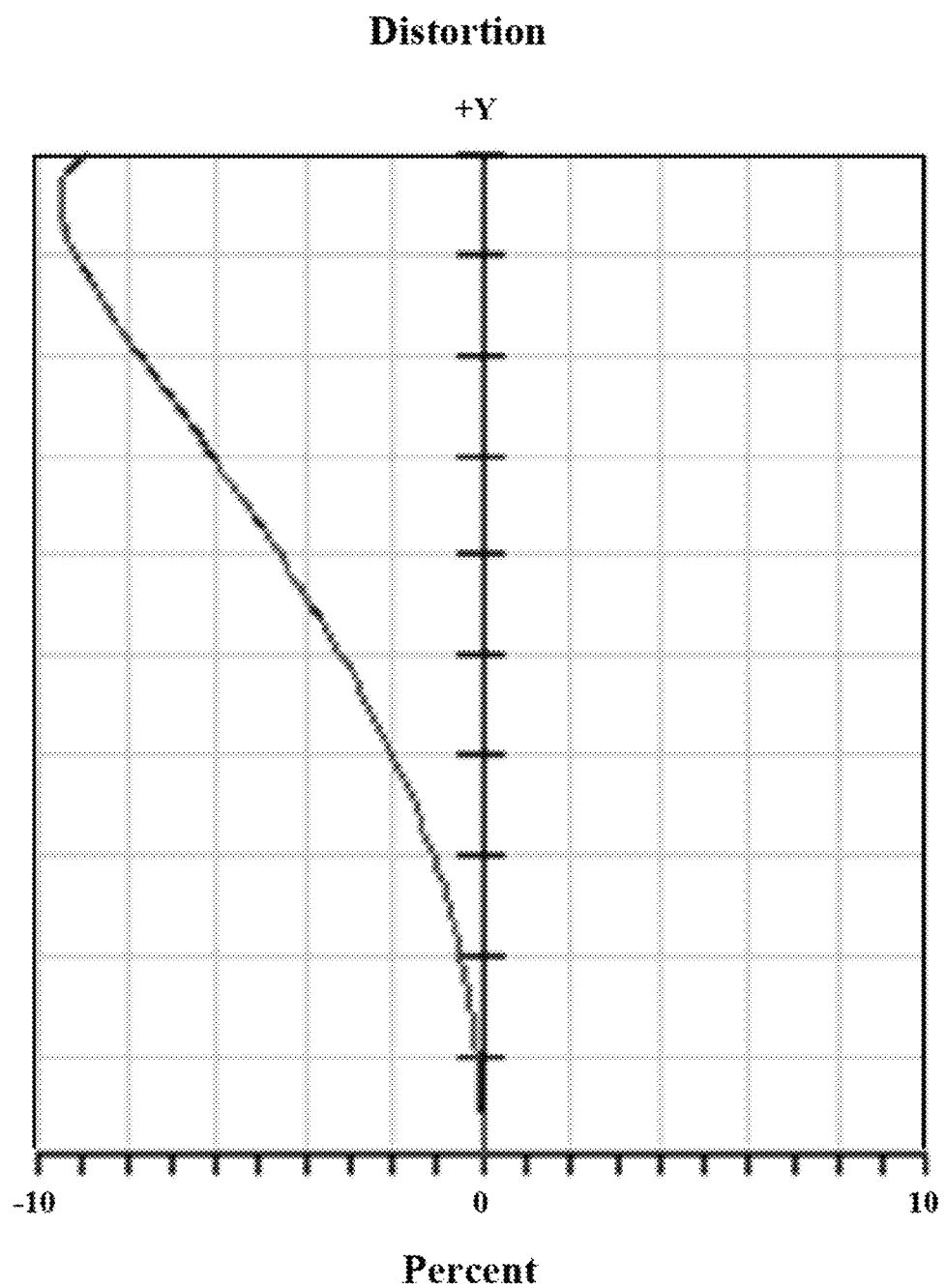
FIG. 13 is a graph plotting the distortion of an image captured by an example modular compound lens as a function of the field.

FIG. 12 is a graph plotting the MTF against the spatial frequency for the compound lens 1100, showing a near-diffraction limit performance, where the MTF at the edge of the field of view (at half angle of 50 degrees) is approximately 50% for 100 lp/mm (the average of 40% for the tangential plane and 60% for the sagittal plane). This suggests that observable contrast is also achieved for substantially greater spatial frequencies than 100 cy/mm FIG. 13 is a graph plotting the distortion of the resulting image as a function of the field for the compound lens 1100, showing an absolute value of less than 10% at maximum. In some embodiments, this distortion can be reduced or corrected by the imaging system's processing unit using suitable software.

In the slender field embodiment depicted in FIGS. 11A and 11B (and other slender field embodiments that include more than one primary-secondary pair), the multiple fields of view can be combined, and subsequently separated, using any of the combination and separation techniques described above. In addition, one or more embodiments of the slender field lens may separate the combined fields of view by controlling the tilt of the combiner 306 (or the tilt of the second beamsplitter used to separate the fields of view from the combined beam) such that the optical data for the different fields of view are directed to respective different areas of the image plane. For example, the tilt of the combiner or separation beamsplitter can be controlled such that the image data for the different fields of view are directed to respective different (parallel) pixel rows of a photodiode array, CCD, or CMOS.

The modular compound lenses described above can achieve a wide field of view in excess of 90 degrees with low image distortion (e.g., less than 10%) and a nearly diffraction limited MTF (e.g., less than 100 lp/mm). The compound lens design allows the field of view to be increased by adding additional optical components in a modular fashion about a combiner, which integrates the optical rays from multiple optical components into a single light beam and directs the combined beam to the downstream lens components for image processing. Moreover, increasing the field of view by adding these modular components does not alter the F-number of the lens. This design facilitates imaging a field of view at extremely wide angles while keeping the total number of optical elements small.

Embodiments of the compound lens described above can be incorporated as components of substantially any type of imaging system, including but not limited to commercial cameras (e.g., digital cameras, film cameras, etc.), multispectral imaging cameras, hyper-spectral imaging camera, etc. The compound lens may also be used in conjunction with a three-dimensional imaging system, such as a time-of-flight camera, capable of measuring depth or distance information for the field of view. For example, when used in a TOF camera for three-dimensional imaging, the compound lens is used to acquire modulated light (e.g., pulse modulated light) that is emitted into the field of view by an illumination system and scattered by objects and surfaces within the field of view. The compound lens acquires a subset of the modulated light scattered by the objects, and the powered optical elements of the compound lens direct the acquired modulated light to sensing elements within the TOF camera. Based on a measurement of the time that elapses between transmission of a modulated light pulse toward a point within the field of view and detection of a return pulse from that point, the TOF camera determines a distance of that point from the camera. By collecting such distance information for an array of points across the field of view, the TOF camera can generate a three-dimensional image containing depth information (e.g., point cloud data) for the field of view.

Figure 14:
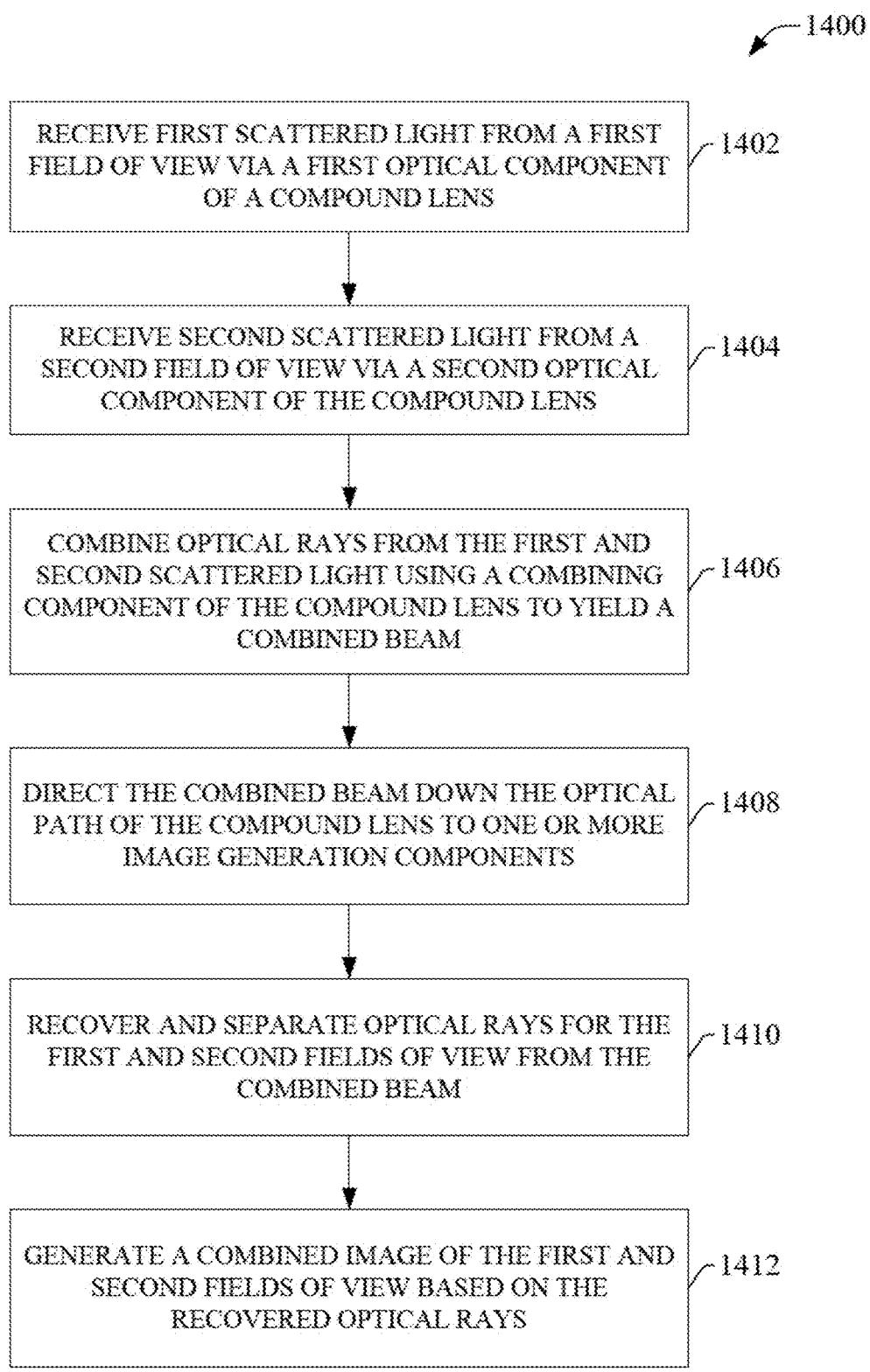
FIG. 14 is a flowchart of an example methodology for generating an image having a wide field of view using a modular compound lens.

FIG. 14 illustrates a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 14 illustrates an example methodology 1400 for generating an image having a wide field of view using a modular compound lens. Initially, at 1402, scattered light from a first field of view is received via a first optical component of a compound lens. The first optical component may comprise, for example, primary and secondary lenses of the compound lens directed to the first field of view. At 1404, second scattered light from a second field of view is received via a second optical component of the compound lens. The second optical component may comprise, for example, second primary and secondary lenses of the compound lens directed to the second field of view. In one or more embodiments, the axis of the second optical compound may be oriented 90 degrees relative to the axis of the first optical component.

At 1406, optical rays from the first and second scattered light is combined using a combining component of the compound lens to yield a combined beam. The combining component may comprise, for example, a dichroic beamsplitting cube, a polarizing beamsplitter cube, a steering mirror or opto-electric valve that combines the optical rays by time-interleaving the first and second light received from the first and second optical components, or another type of combining element. At 1408, the combined beam is directed down the optical path of the compound lens to one or more image generation components. The optical path may comprise a number of other powered optical elements oriented between the combining element and the image generation components.

At 1410, optical rays for the first and second fields of view is recovered and separated from the combined beam. For example, if a dichroic or polarizing beamsplitter cube was used to combine the optical rays at step 1406, a complimentary beamsplitter cube can be used to separate the optical rays from the combined beam. At 1412, a combined image of the first and second fields of view is generated based on the recovered optical rays.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . )

What is claimed is:
1. A compound lens, comprising:
   a first primary powered optical element configured to collect and refract first light from a first field of view to yield first refracted light;
   a first secondary powered optical element configured to refract the first refracted light from the first primary optical element to yield second refracted light;

a second primary powered optical element configured to collect and refract second light from a second field of view to yield third refracted light;

a second secondary powered optical element configured to refract the third refracted light from the second primary optical element to yield fourth refracted light;

a combining component configured to combine the second refracted light from the first secondary powered optical element and the fourth refracted light from the second secondary powered optical element into a combined beam and to direct the combined beam to one or more downstream optical elements along an optical path of the compound lens, wherein the compound lens images a field of view of at least 200 degrees.

2. The compound lens of claim 1, wherein the one or more downstream optical elements comprise a tertiary powered element, a quaternary powered element, and a quinary powered element.

3. The compound lens of claim 1, wherein the combining component comprises a dichroic beamsplitter cube.

4. The compound lens of claim 3, further comprising another dichroic beamsplitter cube configured to receive the combined beam and to recover first optical rays for the first field of view and second optical rays for the second field of view from the combined beam.

5. The compound lens of claim 1, wherein the combining component comprises a polarizing beamsplitter cube.

6. The compound lens of claim 5, further comprising another polarizing beamsplitter cube configured to receive the combined beam and to recover first optical rays for the first field of view and second optical rays for the second field of view from the combined beam.

7. The compound lens of claim 1, wherein the combining component comprises a non-polarizing beamsplitter cube configured to combine approximately 50% of the first light from the first field of view with approximately 50% of the second light from the second field of view.

8. The compound lens of claim 1, wherein the combining component comprises at least one of a controlled steering mirror or an opto-electric valve configured to time-interleave the fourth refracted light and the second refracted light to yield the combined beam.

9. The compound lens of claim 1, further comprising:
a third primary powered optical element configured to collect and refract third light from a second field of view to yield fifth refracted light; and
a third secondary powered optical element configured to refract the fifth refracted light from the third primary optical element to yield sixth refracted light,
wherein the combining component is further configured to combine the fourth refracted light, the second refracted light, and the sixth refracted light into the combined beam, and
wherein addition of the third primary powered optical element and the third secondary powered optical element increases the field of view of the compound lens to at least 300 degrees.

10. The compound lens of claim 2, wherein the compound lens is a component of an imaging system comprising at least one of a camera, a multi-spectral imaging system, a hyper-spectral imaging system, a three-dimensional imaging system, or a time-of-flight camera.

11. The compound lens of claim 1, wherein the compound lens is a component of a time-of-flight camera, and the compound lens is configured to focus modulated light from the first field of view to one or more imaging sensors of the time-of-flight camera configured to generate a three-dimensional image of the first field of view based on analysis of the modulated light.

12. A method for collecting and focusing light from a wide field of view, comprising:
refracting, by a first primary powered optical element of a compound lens, first light from a first field of view to yield first refracted light;
refracting, by a first secondary powered optical element of the compound lens, the first refracted light from the first primary optical element to yield second refracted light;
refracting, by a second primary powered optical element of the compound lens, second light from a second field of view to yield third refracted light;
refracting, by a second secondary powered optical element of the compound lens, the third refracted light to yield forth refracted light;
combining, by the combining component, the fourth refracted light and the second refracted light into a combined beam; and
directing, by the combining component, the combined beam to one or more downstream optical elements along an optical path of the compound lens, wherein the compound lens images a field of view of at least 200 degrees.

13. The method of claim 12, wherein the combining comprises combining using a dichroic beamsplitter cube as the combining component.

14. The method of claim 13, further comprising recovering, using another dichroic beamsplitter cube of the compound lens, first optical rays for the first field of view and second optical rays for the second field of view from the combined beam.

15. The method of claim 12, wherein the combining comprises combining using a polarizing beamsplitter cube as the combining component.

16. The method of claim 15, further comprising recovering, using another polarizing beamsplitter cube of the compound lens, first optical rays for the first field of view and second optical rays for the second field of view from the combined beam.

17. A system for imaging a wide field of view, comprising:
means for refracting first light received at a compound lens from a first field of view to yield first refracted light;
means for refracting the first refracted light to yield second refracted light;
means for refracting second light received at the compound lens from a second field of view to yield third refracted light;
means for refracting the third refracted light to yield forth refracted light; and
means for combining the second refracted light and the fourth refracted light into a combined beam and directing the combined beam to one or more downstream optical elements along an optical path of the compound lens,
wherein the means for refracting the first light, the means for refracting the first refracted light, the means for refracting the second light, the means for refracting the third refracted light, the means for combining and directing, and the one or more downstream optical elements image a field of view of at least 200 degrees.

18. A compound lens, comprising:
a first primary powered optical element configured to collect and refract first light from a first field of view to yield first refracted light;

a first secondary powered optical element configured to refract the first refracted light from the first primary optical element to yield second refracted light;

a combining component configured receive the second refracted light from the first secondary powered optical element and to direct the second refracted light to one or more downstream optical elements along an optical path of the compound lens, wherein the first primary powered optical element, the first secondary powered optical element, and the combining component images a field of view of at least 100 degrees;

a second primary powered optical element configured to collect and refract second light from a second field of view to yield third refracted light; and a second secondary powered optical element configured to refract the third focused light from the second primary optical element to yield fourth refracted light, wherein the combining component is further configured to combine the fourth refracted light and the second refracted light into a combined beam and to direct the combined beam to the one or more downstream optical elements, and wherein addition of the second primary powered optical element and the second secondary powered optical element to the compound lens doubles or substantially doubles the field of view of the compound lens.

19. The compound lens of claim 18, wherein the one or more downstream optical elements comprise a tertiary powered element, a quaternary powered element, and a quinary powered element.

20. The compound lens of claim 18, wherein the combining component comprises a dichroic beamsplitter cube.

* * * * *